May 29, 1956 T. R. SMITH Re. 24,158

CONTROL MEANS FOR A CLOTHES DRIER OR THE LIKE

Original Filed Feb. 5, 1953 5 Sheets-Sheet 1

INVENTOR.
Thomas R. Smith,
BY
Wilkinson Huxley Byron & Hume
Attys.

CONTROL MEANS FOR A CLOTHES DRIER OR THE LIKE

Original Filed Feb. 5, 1953 5 Sheets-Sheet 2

INVENTOR.
Thomas R. Smith,
BY
Wilkinson Huxley Byron & Hume
Attys.

CONTROL MEANS FOR A CLOTHES DRIER OR THE LIKE

Original Filed Feb. 5, 1953 5 Sheets-Sheet 3

INVENTOR.
Thomas R. Smith,
BY
Wilkinson Huxley Byron & Hume
Attys.

CONTROL MEANS FOR A CLOTHES DRIER OR THE LIKE

Original Filed Feb. 5, 1953 5 Sheets-Sheet 4

INVENTOR.
Thomas R. Smith,
BY
Wilkinson Huxley Byron & Hume
Attys

CONTROL MEANS FOR A CLOTHES DRIER OR THE LIKE

Original Filed Feb. 5, 1953 5 Sheets-Sheet 5

INVENTOR.
Thomas R. Smith,
BY
Wilkins, Huxley, Bynum & Hume
Attys.

United States Patent Office

Re. 24,158
Reissued May 29, 1956

24,158

CONTROL MEANS FOR A CLOTHES DRIER OR THE LIKE

Thomas R. Smith, Newton, Iowa, assignor to The Maytag Company, Newton, Iowa, a corporation of Delaware Original No. 2,680,914, dated June 15, 1954, Serial No. 335,186, February 5, 1953. Application for reissue February 27, 1956, Serial No. 568,146

13 Claims. (Cl. 34—44)

Matter enclosed in heavy brackets [ ] appears in the original patent but forms no part of this reissue specification; matter printed in italics indicates the additions made by reissue.

*This is an application for reissue of Patent No. 2,680,914, issued June 15, 1954, on application Serial No. 335,186, filed February 5, 1953.*

The present invention relates to new and novel liquid control means for a liquid container wherein certain operations are performed, and more particularly to such control means for use in a water condenser clothes drier. As to all common subject-matter it is a partial continuation of my copending application Serial No. 259,580, filed December 3, 1951, for Clothes Drier, *now Patent No. 2,717,456.*

In that type of clothes drier heat is used to evaporate [moisure] *moisture* from the clothing and the moisture is condensed by means of water which is introduced into the casing and discharged to drain either by gravity or by a pump. It will be apparent that should the outlet means or the pump become clogged, the continued flow of condensing water would flood the clothes drier with undesirable results. Furthermore, with this type of drier, undesirable results can be obtained if the operator neglects to turn on the water faucet supplying the condensing water. Were the drier operated under such circumstances, the moisture evaporated from the clothing would tend to build up pressure inside the drier and the same would seep out through any openings or seams in the drier, condensing in the drier cabinet and dripping onto the floor. Furthermore, the drying action would be greatly retarded, resulting in a long tumbling and stewing of the clothes in a hot steamy atmosphere, which is not desirable.

Among the objects of the present invention is to provide a novel liquid control means for an apparatus where a certain operation takes place within a container, and which operation requires the introduction of liquid into the same, such, for example, as takes place within a water condenser clothes drier as hereinabove described.

The present invention contemplates a liquid control means for overcoming the above difficulties in a water condenser clothes drier, or the like, wherein a control circuit is provided in combination with means responsive to a predetermined liquid level in the casing or container for the liquid which includes a switch in said circuit whereby the circuit is rendered inoperative should the liquid in the casing or container reach a predetermined level because of clogging of the discharge opening therefor, or failure of the pump if such be used in the combination, such liquid control means further contemplating the incorporation of means responsive to the pressure in the intake conduit for the water which is interconnected with the switch to render the circuit inoperative in the absence of liquid pressure therein even though the circuit has been conditioned for operation of the device, thus overcoming the undesirable results hereinbefore mentioned.

A further object of the invention is to provide a liquid control means as immediately hereinabove described wherein but a single switch is used in the circuit for controlling the condenser water, thus preventing operation of the device due to lack of pressure in the liquid intake, or rendering the device inoperative in the event such condensing water for any reason rises above a predetermined level.

Still another object of the present invention is to provide a novel liquid control means as described above, in which the pressure responsive device may be mounted in the liquid intake, formed as a part of an electrically operated valve, and communicating with the intake side thereof, or, if desired, such device may be associated with the control switch for acting directly thereon. Such device, as well as the means responsive to a predetermined liquid level, may take the form of liquid pressure responsive diaphragms, the former of which is spring biased to respond to any desired pressure in the intake conduit. Where such former device is associated with said intake, any suitable interconnecting means, such as a cord or the like, may be used between the diaphragm and switch.

As a further desideratum, the present invention contemplates a novel control circuit constituted by a three-wire circuit, wherein the heating means is connected across the main circuit conductors and the control switch is located in the neutral wire connected in series to one or more of the main circuit conductors with the drive and timer motors, the electrically operated valve for the intake and any other elements desired, such, for example, as a door switch, pilot light, and inspection lamp.

Other objects, features, capabilities and advantages are comprehended by the invention, as will later appear, and as are inherently possessed thereby.

Referring to the drawings—

Figure 1:
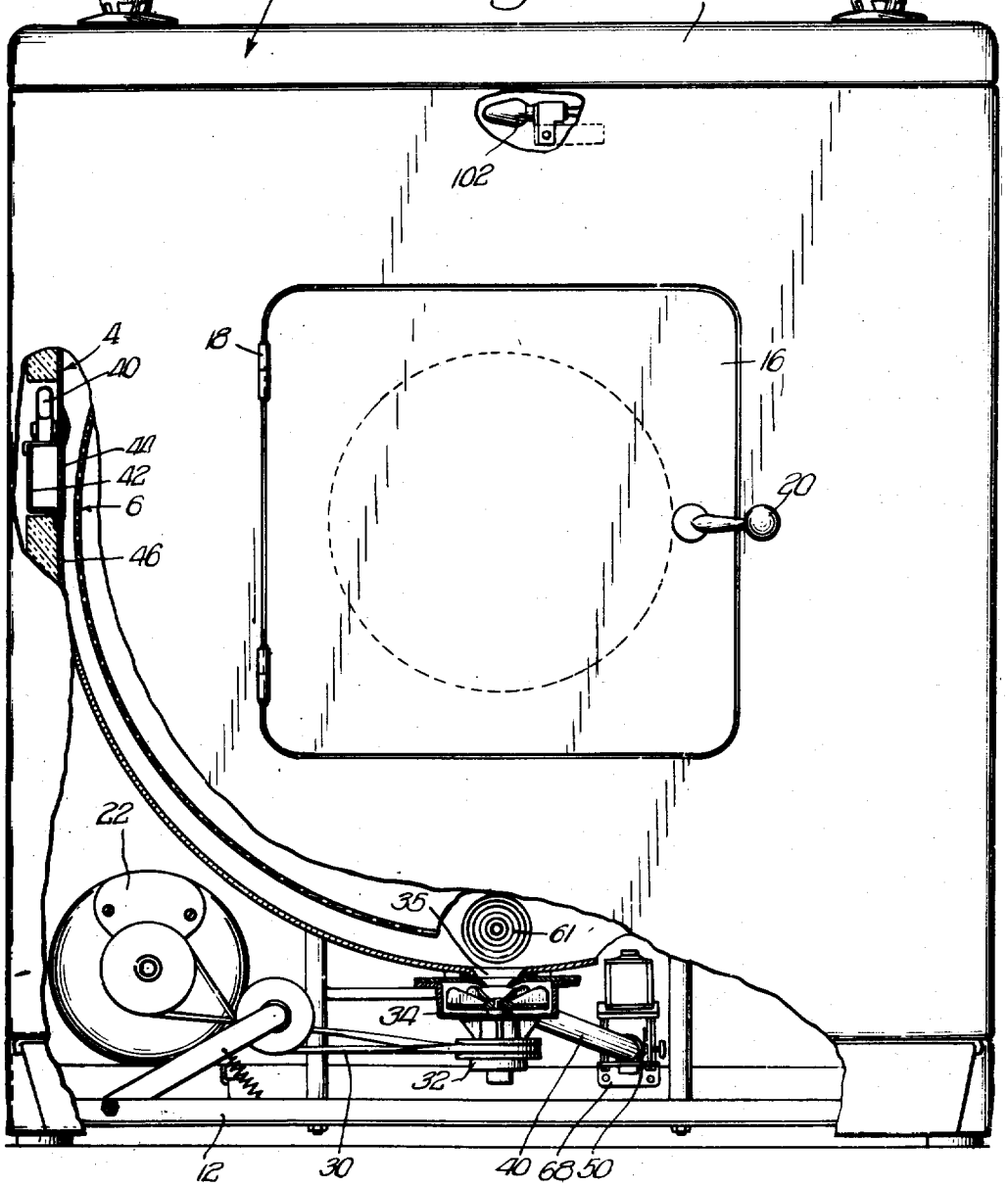
Figure 1 is a front view in elevation of a clothes drier embodying the present invention and having parts cut away to show certain constructions more in detail.
Figure 2:
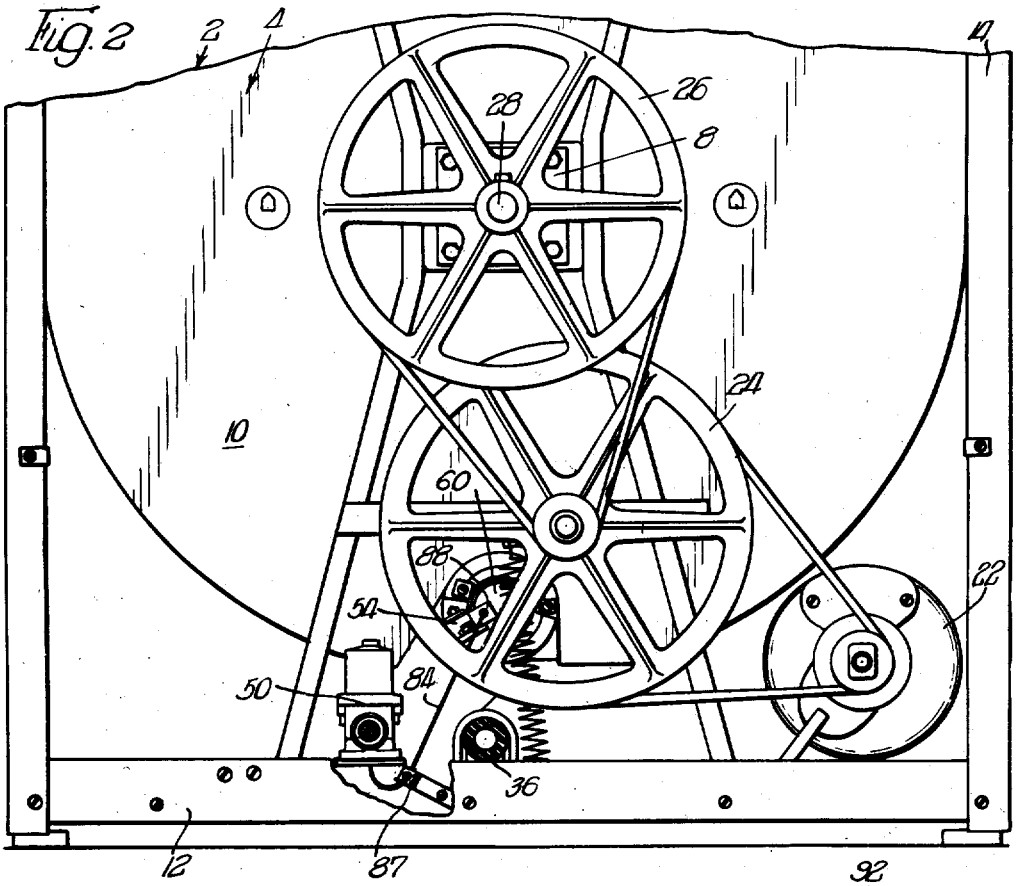
Figure 2 is a fragmentary view in elevation of the rear of the drier, in which the back plate of the cabinet therefor has been removed to disclose the structure involved.

Referring now more in detail to the drawings, an embodiment of the present invention is disclosed in assembled relation with a clothes drier, generally referred to by the reference numeral 2, which is formed with a casing 4 and an inner perforated drum 6, horizontally mounted for rotation within the casing 4, as at 8, through the rear wall 10 of said casing.

The casing and drum are mounted upon any suitable frame structure 12, and the same are enclosed by any suitable cabinet, such as 14, to present a pleasing appearance as a household appliance.

The front wall of the drum 6 is formed with an opening which is concentric with a similar opening in the casing 4 (both of which are not shown in the drawings), the same being in alignment with a door 16 formed as a part of the cabinet and hinged thereto, as at 18, for access to the interior of the drum 6, whereby clothes to be dried may be introduced through the access openings and removed therefrom after a drying operation. This door is provided with a handle 20 for operating a latch to secure the same in closed position.

The assembly further includes a motor 22 suitably mounted upon the frame structure 12, and having a belt and pulley drive, generally referred to as 24, for rotating the pulley 26 mounted on the shaft 28 formed as a part of the perforated drum 6, whereby the drum may be rotated at any desired speed.

This motor on its opposite side is operatively connected through a belt and pulley mechanism 30 to a pulley 32 for driving a centrifugal pump 34 mounted at the lowermost portion of the casing. The pump has an intake communicating with the interior of the casing 4 and a discharge conduit 36 for removing condensing liquid from the interior of the casing 4, as will be hereinafter more fully explained.

The drier herein disclosed is of the type which uses a cooling liquid for condensing the vapor extracted from the clothes during the drying operation. This drying operation is effected through the medium of one or more heating elements, diagrammatically shown in the control circuit of Figure 7 as 38, and mounted in the chamber formed by the casing 4, [perferably] *preferably* adjacent the top thereof. The cooling liquid is introduced through a conduit 40 to a distributor 42 formed with a perforated wall 44 on the inside of the casing 4, whereby the cooling liquid is allowed to flow as a thin sheet extending between the front and rear walls of the casing 4 downwardly over the inner wall 46 thereof, the same being removed by the pump 34 to drain.

The vapor extracted from the clothes is condensed by the cooling liquid on the wall 46, whereby the same, together with the condensed liquid, is discharged by the pump.

The conduit 40 is connected to the outlet 48 of a solenoid operated valve 50, which valve in its construction conforms generally to the valve construction forming the subject matter of the Smith application filed June 10, 1950, and bearing Serial No. 167,284, *now Patent No. 2,708,092*, except that only the cold water side of the valve is used. The intake 52 of the valve is suitably connected by a flexible hose, or the like, to a faucet for supplying cold water to the system. This valve varies from the valve of said application in other respects, as will be hereinafter described.

As hereinabove set forth, the present invention is particularly directed to certain mechanisms which are interlocked to avoid possibilities of operating conditions which might result in damage to or deterioration of the clothes drier, and which would, if they happen, cause considerable inconvenience to the operator.

Firstly, a situation may arise where for some reason the pump may fail, or the discharge means from the casing 4 may become clogged, under which circumstances continued flow of the condensing water will flood the clothes drier, with undesirable results.

Secondly, in the absence of structure as hereinafter pointed out, the drier might be placed in operation without the operator turning on the faucet to introduce the condensing liquid into the casing 4. If this were permitted, the moisture evaporated from the clothing would tend to build up a pressure inside the drier which would seep out through any openings or seams in the casing into the drier cabinet and drip onto the floor. Furthermore, the drying action would be greatly retarded, resulting in a long tumbling and stewing of the clothes in a hot steamy atmosphere, which would be very undesirable.

Figure 7:
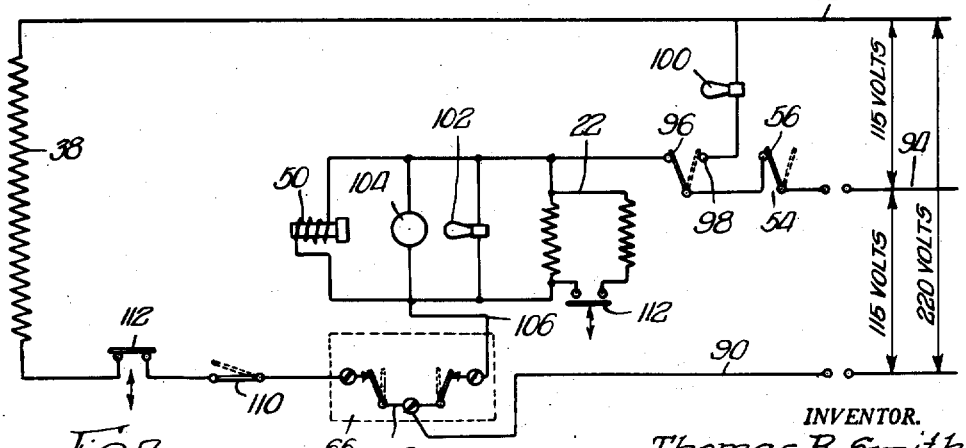
Figure 7 is a diagrammatic disclosure of a control circuit for the clothes drier.
Figure 3:
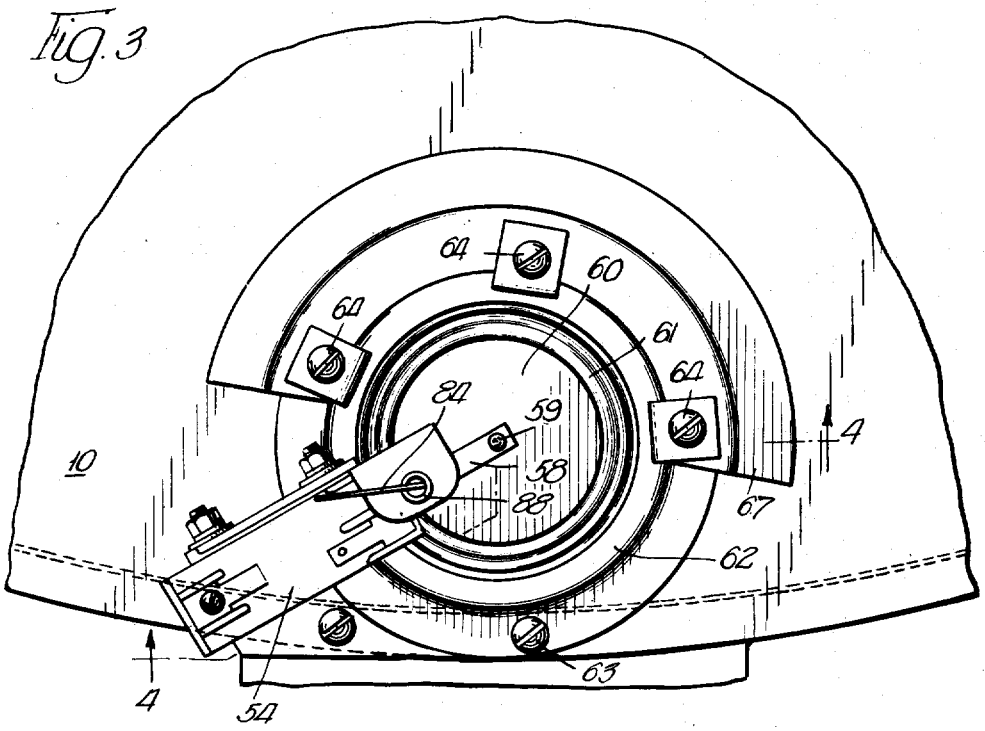
Figure 3 is a fragmentary enlarged view of the rear wall of the casing for the clothes drier disclosing a liquid level switch mechanism for controlling the operating circuit under certain circumstances.
Figure 4:
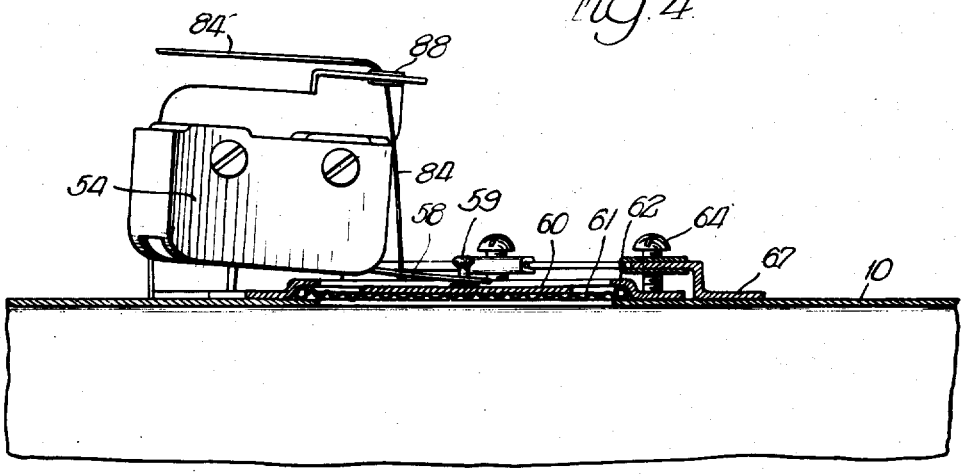
Figure 4 is an enlarged fragmentary sectional view taken along line 4—4 of Figure 3.
Figure 5:
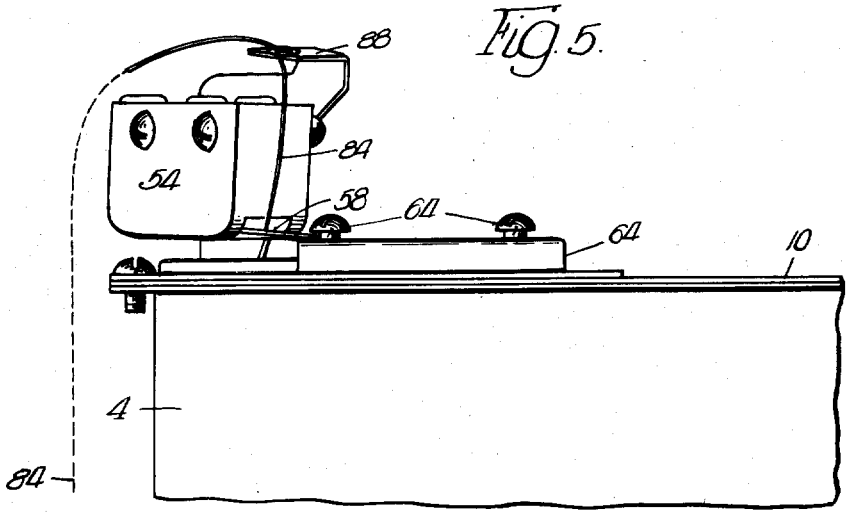
Figure 5 is an enlarged fragmentary view in elevation of the switch mechanism shown in Figures 3 and 4 of the drawings.

To overcome these possible difficulties, the present invention contemplates a liquid level responsive Micro-Swithch 54 mounted in any desired manner upon the rear wall 10 of the casing 4, said switch having the contacts 56 as shown in Figure 7 of the drawings, which are opened and closed by means of a pivoted arm 58. Mounted on the outer end of the arm 58 by means of a swaged pin 59 is a thin plate or disc member 60 which is biased by a light spring loading in the switch (not shown) against a flexible rubber diaphragm 61 mounted across an opening disposed in the rear wall 10 adjacent the sump 35. The outer periphery of the diaphragm is clamped against the outer surface of the rear wall 10 to provide a seal by means of a generally annular shaped ring member 62 which has its lower portion or sector secured to the rear wall through screws 63, and its upper portion or sector pressed against the wall by means of compression screws 64 carried in a sector shaped inwardly opening Z-shaped bracket 67. An arrangement of this type is readily assembled and disassembled and provides a smooth surface to the interior of the casing to prevent the accumulation of lint about the diaphragm. By mounting the diaphragm in the lowermost portion of the side wall and so proportioning its size and resiliency, it will respond to a very low head of liquid, shoulde the drain opening be clogged, by pressing against the disc which in turn moves the arm 58 to open the circuit.

Under normal operating conditions, the drying cycle is controlled by a timer 66, diagrammatically shown in Figure 7, and in the absence of failure of the pump 34 or clogging of the discharge means from the casing 4, the drier is under control of the timer and will go through a cycle of operation in accordance with the setting of the said timer.

Should the pump fail, or the discharge means become clogged, water will immediately arise within the casing 4 to such point that the diaphragm 61 is caused to bulge outwardly under the hydrostatic head, whereby the plate 60 carrying the pin 59 moves the pivoted arm 58 to open the contacts 56 of the Micro-Switch, which will render the circuit inoperative and cause the drier to stop its operation.

The control circuit in its details will be hereinafter more fully set forth.

Figure 6:
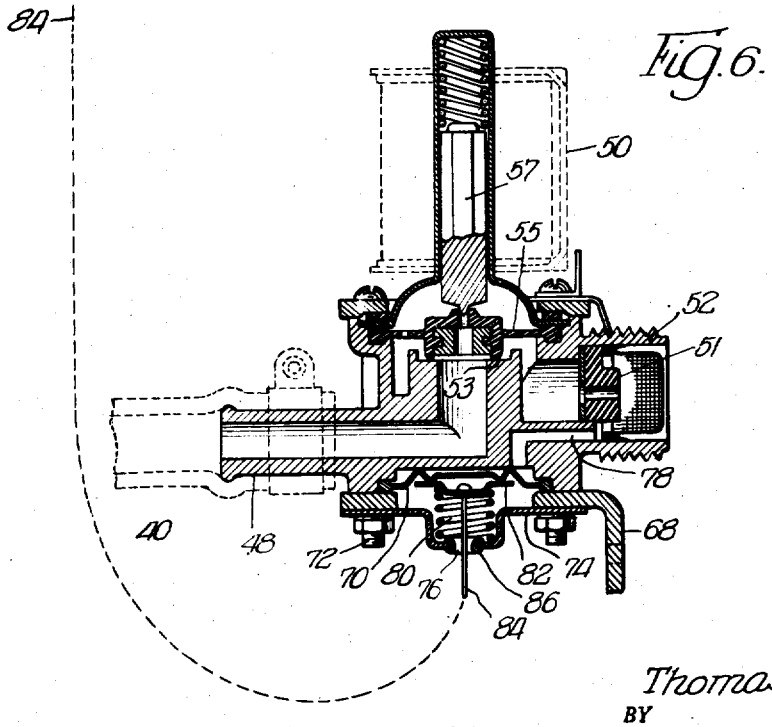
Figure 6 is a cross sectional view of an electrically operated valve mechanism controlling the flow of liquid into the casing for the clothes drier and embodying certain features of construction of the present invention.

The present invention contemplates the use of a single switch to obviate the possibilities of the second contingency arising, namely: operation of the clothes drier without opening the service faucet to introduce a cooling liquid into the casing 4. In the illustrative example of the invention, the solenoid valve 50 which is secured to the frame structure 12 through any suitable means, such as the bracket 68, is modified to include a diaphragm 70 suitably mounted in any desired manner, as by means of the bracket 68 and securing means 72 on the housing for the solenoid valve 50. This mounting further involves a closure member 74 having an aperture 76 therethrough, said closure member also being held in operative position through the securing means 72. The diaphragm 70 is in communication through a conduit or passage 78 with the intake side 52 of the valve 50, between the valve and the service faucet, and in the absence of liquid pressure on the intake side of the valve, the diaphragm 70 is in the position as shown in Figure 6, the same being forced into said position by means of a coil spring 80 having abutting relation with the housing member 74 at one end and having abutting relation with a follower member 82 at its other end. The follower member 82 is connected by a flexible cord 84 to the pivoted arm 58 of the micro-switch, the same passing through eyelets 86 and 87 adjacent the bottom of the solenoid valve 50 and through an eyelet 88 attached to the micro-switch 54.

In this valve the condensing water enters the valve 50 at the inlet 52, passes through the constant flow control orifice 51, across the valve seat 53, and out of the discharge end 48 connected to the conduit 40. In this instance, the sealing element 55 is of the diaphragm type and is under the control of a solenoid operated plunger 57 which is adapted to control the flow of water to the condensing water inlet chamber 42.

In the absence of pressure on the intake side of the solenoid valve 50, the positioning of the diaphragm 70 under the influence of the spring 80 causes the flexible cord 84 to move the pivoted arm 58 of the micro-switch to open the contacts 56. Thus, even though the timer may be set for a drying cycle, the control circuit is rendered inoperative to cause operation of the drier.

Accordingly, the results desired to overcome the two potentially undesirable circumstances which might occur in a clothes drier of the type herein disclosed is overcome by the two mechanisms involved, the same being interlocked through a single control switch in the control circuit.

The control circuit of the device is a three-wire circuit having the main circuit conductors 90 and 92 to which one or more heating elements 38 are connected in order to supply a 220-volt circuit for the heating elements.

The circuit further includes a middle or neutral conductor 94, whereby 115 volts may be supplied between the neutral conductor and either one of the main circuit conductors 90 or 92. As shown in Figure 7 of the drawings, the micro-switch 54 has its contacts 56 in the neutral conductor 94, and said conductor further has a door switch 96 suitably associated with the door 16, whereby operation of the drier is prevented until such time as the door is closed. This door switch is a two-way switch which, when the door is in open position, completes a circuit through the contact 98 between conductors 92 and 94, whereby the lamp 100 is lighted so that removal of the clothes from the interior is facilitated.

The micro-switch [56] *54* is in series with the drive motor 22, pilot light 102, motor 104 for driving the timer 66, and the solenoid valve 50, the circuit including these operating elements being connected to the main conductor 90 through the conductor 106 and the timer circuit 108.

The above described circuit further includes the thermostat 110 in the main conductor 90, said thermostat being located within the chamber provided by the casing 4 to render the circuit inoperative in the event the temperature therein exceeds a predetermined mount. Also incorporated in the circuit is a centrifugally operated switch 112 for the drive motor, the same being incorporated so that in the event that contacts 56 of the micro-switch 54 are opened because of either one of the contingencies hereinabove set forth, the deceleration of the drive motor when this occurs causes the centrifugal switch 112 to open, whereby the main circuit for the heating elements is broken to render the drier inoperative.

*To clarify the function and operation of switch 54, it should be understood that this switch is controlled by two separate, opposite and equal bias forces. Switch 54 is subjected first to an internal bias which tends to close its contacts 56. This bias is opposed and exceeded in magnitude by the bias exerted by the spring 80 acting through the flexible cord 84 which provides a lost motion connection between switch arm 58 and the pressure sensitive diaphragm 70 responsive to the pressure within water inlet 52.*

*When the drier is isolated from water pressure, switch 54 assumes an open position due to the bias of spring 80. Upon the supplying of fluid to the intake 52 of valve 50, diaphragm 70 moves against the bias of spring 80 to relax the tension in cord 84 and allow switch 54 to close under its own internal bias. This conditions the drier for operation by timer 66 when electrical power is made available to the control circuit.*

*Once the drier is in operation, it will function in accordance with the timer's programmed sequence unless the condensing fluid entering the drier fails to drain properly*

*from hose 36 and accumulates within the condenser casing. Such an abnormal accumulation causes diaphragm 61 to move switch arm 58 in opposition to the internal bias of switch 54 and independently of the presence of fluid pressure within valve intake 52. This movement of switch arm 58 opens switch 54 to deenergize solenoid valve 50 and motor 22. The deenergization of valve 50 terminates fluid flow into the condenser chamber while deenergization of motor 22 terminates the operation of heater 38 and the rotation of drum 16.*

Figure 8:
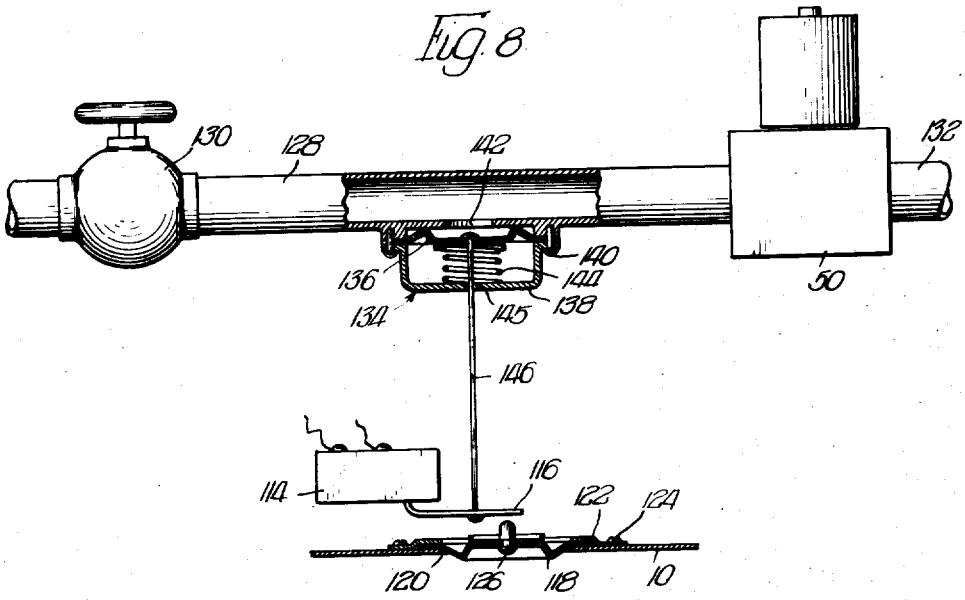
Figure 8 is an illustrative view of a modified form of control for the operating circuit of a drier disclosing the interlock between the Micro-Switch and the intake side of the water inlet.

Figure 8 shows a modified form of control for the circuit of a clothes drier of the type hereinbefore described, the same including a micro-switch 114 corresponding to the micro-switch 54 of the first described embodiment. As in the previously described embodiment, this micro-switch is included in a circuit as disclosed in Figure 7 of the drawings. This micro-switch is provided with the usual contacts for making and breaking the circuit through the pivotal arm 116. In this embodiment, the liquid level diaphragm 118 is mounted in the opening 120 of the rear wall 10 of the casing in any desired manner, for example, by means of the annular securing element 122 connected, as by means of screws 124, to said rear wall. The diaphragm 118 carries a pin 126 in opposed relation to the pivotal arm 116 of the switch 114.

The water intake conduit 128 is shown as being provided with the valve 130, the said intake conduit being connected to the intake side of a solenoid valve 50 which has a discharge conduit 132 connected thereto and leading to the distributor 42 of the drier. Between the solenoid valve 50 and the valve 130 is a diaphragm assembly 134 conforming in its essentials to the previously described diaphragm assembly associated with the solenoid 50, said assembly including the diaphragm 136 enclosed by the housing 138 secured to the intake conduit 128 as by means of screws 140 or the like, the said housing serving to hold the marginal edges of the diaphragm between the same and the said intake conduit 128. This diaphragm 136 is in communication with the intake conduit 128 through an opening 142. Interposed between the housing 138 and the diaphragm 136 is a coil spring 144 which tends to move the diaphragm 136 into the position as shown in Figure 8 of the drawing in the absence of water pressure in the conduit 128. The diaphragm 136 is interconnected with the pivotal arm 116 of the micro-switch 114 through the medium of an interlocking element 146 which extends through an opening 145 in the housing 138.

As will be apparent, the control as shown in Figure 8 of the drawings is in such a position that the contacts of the micro-switch 114 are in open position. *This is due to the bias action of coil spring 144 which elevates link element 146 in opposition to the internal bias of switch 114 acting on switch arm 116.* As soon as the valve 130 is open and pressure is applied to the diaphragm 136, the same is caused to move outwardly *against the action of coil spring 144* to allow the pivotal arm 116 to move into engagement with the pin 126 *in response to the internal bias of the switch*, thereby closing the contacts of the micro-switch to complete the circuit as previously described. In the event that the water level in the casing for the drier, as previously described, should rise a predetermined amount, the diaphragm 118 will be caused to move outwardly with respect to the wall 10 to move the arm 116 of the micro-switch *against the opposing internal bias of the switch* to cause the contacts thereof to open and to thereby de-energize the control circuit. It will also be appreciated that the operation of the drier cannot be initiated even though the circuit may be conditioned until such time as the operator opens valve 130. *This last feature is achieved through the use of the lost motion connection existing between switch arm 116 and the enlarged lower end of rod 146.*

Figure 9:
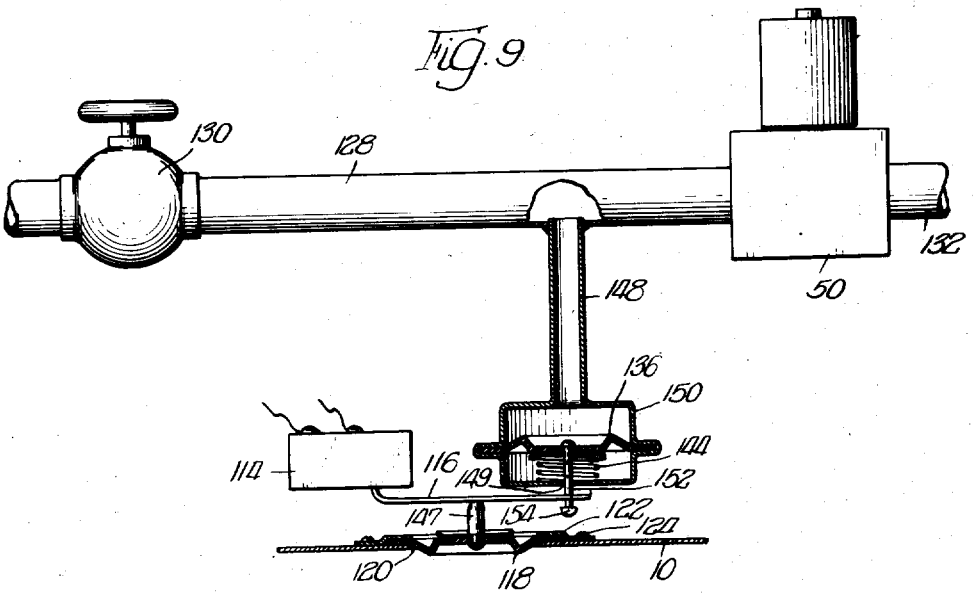
Figure 9 is an illustrative view of still another modified form of control for the operating circuit of a drier disclosing the interlock between the Micro-Switch and the intake side of the water inlet.

Figure 9 discloses a further modified form of control for the circuit of a clothes drier of the type hereinbefore disclosed and described. This embodiment conforms in a good many respects to the form shown in Figure 8 of the drawings and, accordingly, similar elements will be referred to by similar reference numerals.

The micro-switch 114 is provided with the usual contacts for making and breaking a circuit through a pivotal arm 116. The liquid level diaphragm 118 is mounted in opening 120 of the rear wall 10 of the casing in any desired manner, for example, by means of the annular securing element 122 connected, as by screws 124, to said rear wall. The diaphragm 118 carries a pin 147 in opposed relation to the pivotal arm 116 of the switch 114.

The water intake conduit 128 is shown as being provided with the valve 130, the said intake conduit being connected to the intake side of the solenoid valve 50 which has a discharge conduit 132 connected thereto and leading to the distributor 42 of the drier. Interposed between the intake valve 130 and the solenoid valve 50 and communicating with the conduit 128 is a conduit 148 having an enlarged housing 150 at the outer end thereof in which the diaphragm 136 is mounted. Interposed between the housing 150 and the diaphragm 136 is a coil spring 144 for normally urging the diaphragm 136 into a position to move the lever arm [146] *116* of the micro-switch to break the circuit when there is no water pressure acting on the inside face of the diaphragm, which circumstances would prevail when the valve 130 is closed. Diaphragm 136 and the lever arm 116 of the switch [is] *are* interconnected by the interlocking element 152. This element is connected at one end of the diaphragm 136 and extends outwardly through an opening 149 in the housing 150 and through an opening in the lever arm [146] *116* and is provided with an enlarged head 154 at the outer end thereof.

As will be apparent from the disclosure, the lever arm [146] *116* of the micro-switch is in abutting relation with the pin 147 of the water level diaphragm 118 so that in the event the water in the casing rises above a predetermined amount, the diaphragm 118 will be caused to move outwardly to raise the lever arm 116 and to break the contacts of the micro-switch so as to render the circuit inoperative.

As shown, the diaphragm 136 is in the position which it takes when there is water pressure in the intake conduit 128 and the conduit 148 [, but when]. *In this position the lost motion connection between lever arm 116 and the enlarged head 154 on element 152 permits a shifting of lever arm 116 and allows switch 114 to close under its own internal bias. When* the valve 130 is closed, *the stronger bias of spring 144 overcomes the internal bias of switch 114 and* the enlarged head 154 engages the lever arm [146] *116* of the micro-switch 114 to raise the same to disengage the contacts and to break the circuit. This is the position of the lever arm [146] *116* when the valve 130 is closed and, as previously described, the circuit is rendered inoperative even though conditioned for a cycle of operation until the valve 130 is opened to admit water through the distributor 42 to the drier.

While I have herein described and upon the drawings shown illustrative embodiments of the invention, it is to be understood that the invention is not limited thereto, but may comprehend other constructions, arrangements of parts, details and features without departing from the spirit of the invention.

I claim:

1. In a clothes drier, the combination of a casing, a drum within said casing for receiving clothes to be dried, a motor for rotating said drum, heating means for evaporating moisture contained within said clothes, conduit means for supplying a cooling liquid into said casing to condense the vapor within said casing produced during a drying operation, means for discharging said liquid and condensed vapor from said casing, a control circuit including said motor and heating means therein, a switch in said circuit, means responsive to an abnormal rise in the liquid level in said casing to operate said switch whereby said circuit is rendered inoperative should the liquid in said casing reach said abnormal level, and means also responsive to the pressure in said conduit means for controlling operation of said switch to render said circuit inoperative in the absence of liquid pressure in said conduit means even though said circuit has been conditioned for operation of said drier.

2. In a clothes drier, the combination of a casing, a drum within said casing for receiving clothes to be dried, a motor for rotating said drum, heating means for evaporating moisture contained within said clothes, conduit means for supplying a cooling liquid into said casing to condense the vapor within said casing produced during a drying operation, a pump having outlet means for discharging said liquid and condensed vapor from said casing driven by said motor, a control circuit including said motor and heating means therein, a switch in said circuit, means responsive to an abnormal rise in the liquid level in said casing to operate said switch whereby said circuit is rendered inoperative should the liquid in said casing reach said abnormal level, should said pump fail, or the inlet or outlet therefor become obstructed, and means also responsive to the pressure in said conduit means for controlling operation of said switch to render said circuit inoperative in the absence of liquid pressure in said conduit means even though said circuit has been conditioned for operation of said drier.

3. In a clothes drier, the combination of a casing, a drum within said casing for receiving clothes to be dried, a motor for rotating said drum, heating means for evaporating moisture contained within said clothes, conduit means for supplying a cooling liquid into said casing to condense the vapor within said casing produced during a drying operation, means for discharging said liquid and condensed vapor from said casing, an electrically operated valve in said supply conduit for controlling flow of liquid into said casing, a control circuit including said motor, heating means and valve, a switch in said control circuit, means responsive to an abnormal rise in the liquid level in said casing to operate said switch whereby said circuit is rendered [inoperatve] *inoperative* should the liquid in said casing reach said abnormal level, and means forming a part of said valve responsive to the pressure on the intake side of said valve and also interconnected with said switch for controlling the same to render said circuit inoperative in the absence of liquid pressure on said intake side even though said circuit has been conditioned for operation of said drier.

4. A clothes drier according to claim 2, in which a diaphragm is mounted in communicating relation with said casing for operating the switch when liquid therein reaches said abnormal level.

5. A clothes drier according to claim 2, in which a spring pressed diaphragm mounted in the supply conduit is interconnected with the switch for control thereof.

6. A clothes drier according to claim 2, in which a diaphragm is mounted in communicating relation with said casing for operating the switch when liquid therein reaches said abnormal level, and in which a spring pressed diaphragm mounted in the supply conduit is interconnected with the switch for control thereof.

7. A clothes drier according to claim 3, and in which the means forming a part of the valve includes a spring pressed diaphragm mounted in the valve and is in communication with the intake side thereof for controlling the switch.

8. A clothes drier according to claim 3, in which a timer mechanism driven by a timer motor in the control circuit is provided to control the operation of the drier.

9. In a clothes drier, the combination of a casing, a drum within said casing for receiving clothes to be dried, a drive motor for rotating said drum, heating means for evaporating moisture contained within said clothes, conduit means for supplying a cooling liquid into said casing to condense the vapor within said casing produced during a drying operation, an electrically controlled valve in said supply conduit for controlling flow of liquid therethrough, a timer for controlling the operation of said drier, a motor for driving said timer, a three-wire control circuit including a neutral conductor and having said heating means disposed across the main circuit conductors, a switch in said neutral conductor, means responsive to an abnormal rise in the liquid level in said casing to operate said switch in series with said drive and timer motors and said valve connected to one of said main circuit conductors to render said control circuit inoperative should the liquid in said casing reach said abnormal level, and means responsive to the pressure in said conduit means on the intake side of said valve for also controlling operation of said switch to render said control circuit inoperative in the absence of liquid pressure in said conduit means even though said circuit has been conditioned by said timer for operation of said drier.

*10. In a clothes drier, a drum for receiving moist fabrics to be dried, drive means for driving said drum, heating means for evaporating moisture from said fabrics, means defining a condensing chamber for condensing the moisture evaporated from said fabrics, conduit means for supplying cooling fluid to said condensing chamber to condense said evaporated moisture, a fluid conduit communicating with said condensing chamber for discharge of fluid from said chamber, valve means controlling fluid flow through said conduit means, solenoid means controlling said valve means, a circuit for energizing said drive means, said heating means and said solenoid means, a switch controlling energization of said circuit, first and second bias means urging said switch toward opposite positions, means responsive to fluid pressure within said conduit means for overcoming said second bias means to permit said first bias means to move said switch into a first position to energize said circuit, and means responsive to an abnormal rise of fluid within said condensing chamber for overcoming said first bias means to move said switch into a second position to deenergize said circuit.*

*11. In a clothes drier, a drum for receiving moist fabrics to be dried, heating means for evaporating moisture from said fabrics, means defining a condensing chamber for condensing the moisture evaporated from said fabrics, conduit means for supplying cooling fluid to said condensing chamber to condense said evaporated moisture, a fluid outlet communicating with said condensing chamber for discharge of fluid from said chamber, valve means controlling fluid flow through said conduit means, solenoid means controlling said valve means, a circuit for energizing said heating means and said solenoid means, a switch controlling energization of said circuit, first and second opposing bias means urging said switch toward opposite positions, means responsive to fluid pressure within said conduit means for overcoming said second bias means to permit said first bias means to move said switch into a first position to energize said circuit, and means responsive to an abnormal rise of fluid within said condensing chamber for overcoming said first bias means to move said switch into a second position to deenergize said circuit.*

*12. In a clothes drier, a drum for receiving moist fabrics to be dried, heating means for evaporating moisture from said fabrics, means defining a condensing chamber for condensing moisture vapor from said fabrics, conduit means for supplying cooling fluid to said condensing chamber to condense said vapor, a fluid outlet communicating with said condensing chamber for discharge of fluid from said chamber, valve means controlling fluid flow through said conduit means, solenoid means controlling said valve means, a circuit for energizing said heating means and said solenoid means, a switch controlling energization of said circuit, first means biasing said switch toward a closed position to energize said circuit, second means biasing said switch toward an open position to deenergize said circuit, said second means exerting a greater bias than said first means on switch to place said switch in an open position, a lost-motion connection interconnecting said first and second means, means responsive to fluid pressure within said conduit means for overcoming said second means to permit said first means to close said switch and energize said circuit, and means responsive to an abnormal rise of fluid within said condensing chamber for overcoming said first means to move said switch into said open position.*

*13. In a clothes drier, a drum for receiving moist fabrics to be dried, drive means for driving said drum, heating means for evaporating moisture from said fabrics, means defining a condensing chamber for condensing moisture vapor from said fabrics, conduit means for supplying cooling fluid to said condensing chamber to condense said vapor, a fluid outlet communicating with said condensing chamber for discharge of fluid from said chamber, valve means controlling fluid flow through said conduit means, solenoid means controlling said valve means, a circuit for energizing said drive means, said heating means and said solenoid means, a switch controlling energization of said circuit, first means biasing said switch toward a closed position to energize said circuit, second means biasing said switch toward an open position to deenergize said circuit, said second means exerting a greater bias than said first means on said switch to place said switch in an open position, a lost-motion connection interconnecting said first and second means, means responsive to fluid pressure within said conduit means for overcoming said second means to permit said first means to close said switch and energize said circuit, and means responsive to an abnormal rise of fluid within said condensing chamber for overcoming said first means to move said switch into said open position to deenergize said circuit independently of said second means.*

References Cited in the file of this patent or the original patent

UNITED STATES PATENTS

| | | |
|---|---|---|
| 2,538,200 | Johnston | Jan. 16, 1951 |
| 2,590,295 | Constantine | Mar. 25, 1952 |
| 2,621,423 | Clark | Dec. 16, 1952 |
| 2,628,296 | Dillman | Feb. 10, 1953 |
| 2,636,093 | Clark et al. | Apr. 21, 1953 |
| 2,644,245 | Hammell et al. | July 7, 1953 |
| 2,680,914 | Smith | June 15, 1954 |